United States Patent [19]
Ota et al.

[11] Patent Number: 4,959,741
[45] Date of Patent: Sep. 25, 1990

[54] MAGNETIC HEAD WITH A CONTROLLED GAP WIDTH

[75] Inventors: Hiroyuki Ota; Kazuhiko Sato, both of Saitama, Japan

[73] Assignee: Pioneer Electronic Corporation, Tokyo, Japan

[21] Appl. No.: 155,947

[22] Filed: Feb. 16, 1988

[30] Foreign Application Priority Data

Feb. 16, 1987 [JP] Japan ................................. 62-31527

[51] Int. Cl.$^5$ ............................................... G11B 5/22
[52] U.S. Cl. ................................................... 360/122
[58] Field of Search ......................... 360/122, 125–127

[56] References Cited
FOREIGN PATENT DOCUMENTS
0030625 6/1981 European Pat. Off. .

OTHER PUBLICATIONS
IBM Technical Disclosure Bulletin, vol. 20, No. 2, Jul. 1977.
Japanese Patent Abstracts, vol. 9, No. 72.
Japanese Patent Abstracts, vol. 6, No. 41.
Japanese Patent Abstracts, vol. 10, No. 64.

Primary Examiner—John H. Wolff
Attorney, Agent, or Firm—Sughrue, Mion, Zinn, Macpeak & Seas

[57] ABSTRACT

A magnetic recording playback head and a method for producing the same having an improved wear resistance and resistance to chipping as well as an improved production rate. The head is formed from a pair of magnetic cores joined through a gap-forming film. The lateral sides of the gap are flat, except for the surface repair to contact the tape, which have a width equal to the track width. The flat sides are coated with a non-magnetic thin hard film of a material such as alumina or titanium nitride.

3 Claims, 3 Drawing Sheets

MAGNETIC HEAD WITH A CONTROLLED GAP WIDTH

BACKGROUND OF THE INVENTION

The present invention relates to an improved magnetic head to be mounted adjacent the periphery of a drum which is rotated as magnetic tape is helically passed across the drum for helical recording or playback in a video tape recorder, audio digital tape recorder, etc.

Prior art magnetic tape recorders of the type contemplated by the present invention have a recording or reproducing track width of the order of several tens of microns.

The process for fabricating a magnetic head having such a small track width is hereinafter described with reference to FIGS. 1 and 2. As shown in FIG. 1, blocks 1a and 1b serving as two halves of a core are each worked on one surface to form a plurality of track width controlling grooves 16, and a gap forming thin film is formed on the respective gap defining surfaces 2a and 2b. Then, as shown in FIG. 2, the two blocks are joined together in such a way that the opposite grooves 16 are in registry. Thereafter, the grooves 16 are filled with a glass filler material 3 to form a single head block. This head block is ground and polished to provide a cylindrical surface that contacts the magnetic tape. The thus-worked block is sliced into discrete magnetic heads.

In the head fabrication process, it is important that the half blocks 1a and 1b be joined together with registry attained between the opposite track width controlling grooves 16. If misalignment occurs, the prescribed track width is not attainable.

The recent tendency is to decrease the track width defined by the magnetic heads in order to achieve a higher recording density. This has introduced even greater difficulty in joining together the two half blocks without loss of registry between the opposite track width control grooves 16.

To deal with this problem a magnetic head of the type shown in FIG. 3 has been proposed. This magnetic head is fabricated by the process depicted in FIGS. 4–7. First, blocks 5a and 5b serving as two halves of a core and which are not provided with any track width control grooves are prepared as shown in FIG. 4. After a gap-forming thin film is formed on each of the blocks, they are joined together to form a single core block 6a as shown in FIG. 5. This core block 6a is ground and polished to provide a cylindrical surface that contacts magnetic tape. Thereafter, grooves 17 are formed across the magnetic gap, except for a region corresponding to the track width (see FIG. 6), and the head block 6b is sliced along the center line of each groove 17 to form discrete magnetic heads as shown in FIG. 7.

Alternatively, a head block of the type shown in FIG. 3 may be produced by filling glass 18 in the grooves 17 in the head block 6b, which is thereafter sliced into discrete magnetic heads.

Because of the brittleness of the core material, chipping often occurs in the magnetic head shown in FIG. 7, either during the working of the head block or on account of sliding friction with the magnetic tape after it has been worked into the magnetic head. As a further problem the magnetic tape has a tendency to wear quickly since it contacts magnetic tape over a very small area.

A significant problem associated with the magnetic head shown in FIG. 3 is the great difficulty involved in achieving uniform filling of the grooves 17 with glass 18, and the resulting low production rate causes an undue increase in the price of the magnetic head compared with the product fabricated by the process illustrated in FIGS. 1 and 2.

SUMMARY OF THE INVENTION

An object, therefore, of the present invention is to solve the aforementioned problems of the prior art magnetic heads and to provide an inexpensive but well performing magnetic head that is free from chipping and which exhibits a high wear resistance.

These and other objects of the present invention are attained by a magnetic head having a pair of magnetic cores joined together with a gap-forming film to form a magnetic gap, both lateral sides of said gap being flat except for the surface that is to be in sliding contact with magnetic tape and which has the same width as a track width. Each of the flat sides in coated with a nonmagnetic thin hard film.

DESCRIPTION OF THE PREFERRED EMBODIMENTS

An example of a process for fabricating the magnetic head of the present invention is hereinafter described with reference to FIGS. 8–12.

Figure 1:
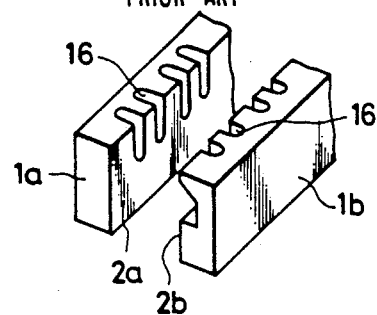
FIGS. 1 and 2 are perspective views showing two principal steps for fabricating a prior art magnetic head.
Figure 2:
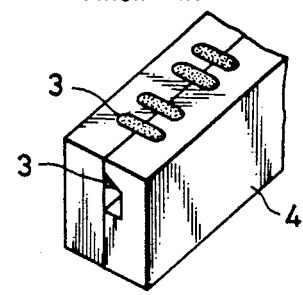
Figure 3:
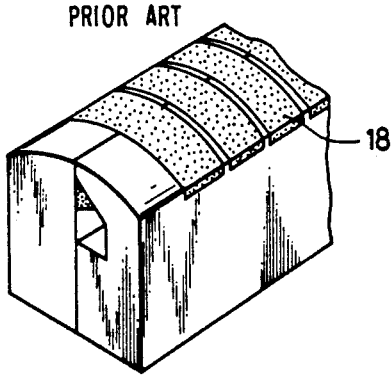
FIG. 3 is a perspective view showing another process for fabricating the magnetic head shown in FIG. 7.
Figure 4:
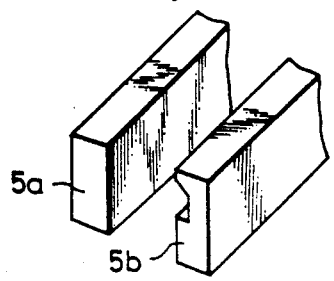
FIGS. 4 to 7 are perspective views showing the sequence of steps for fabricating another prior art magnetic head.
Figure 5:
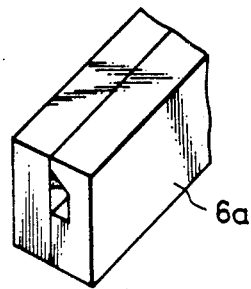
Figure 6:
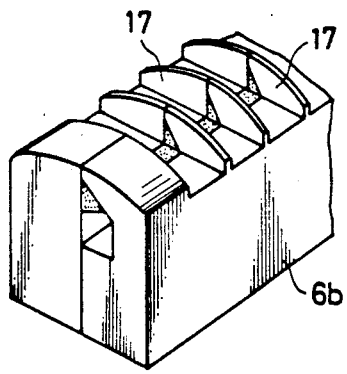
Figure 7:
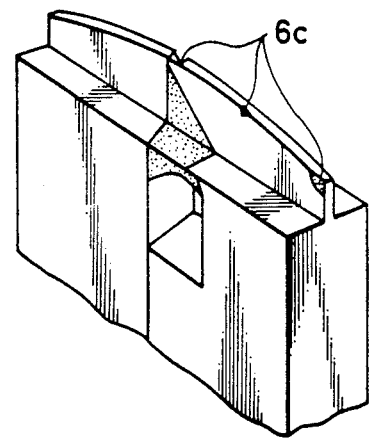
Figure 8:
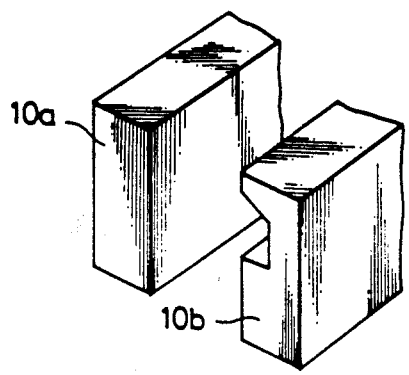
FIGS. 8 to 11 are perspective views showing a sequence of steps for fabricating the magnetic head shown in FIG. 12.
Figure 9:
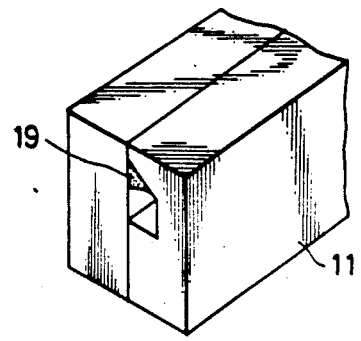
Figure 10:
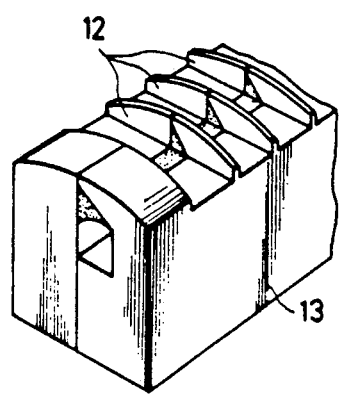

In FIG. 8, half blocks made of a magnetic oxide material such as a ferrite are indicated by reference numerals 10a and 10b. After forming a gap-forming thin film on the respective gap defining surfaces, the blocks are joined together with adhesive glass 19, as shown in FIG. 9, to form a single core block 11. This block is then ground and polished to provide a curved surface 20 that is to be in sliding contact with the magnetic tape, and a plurality of track width defining grooves 12 are cut in the curved surface, leaving ridges whose width is the same as the track width, thereby producing a head block 13 as shown in FIG. 10.

Figure 11:
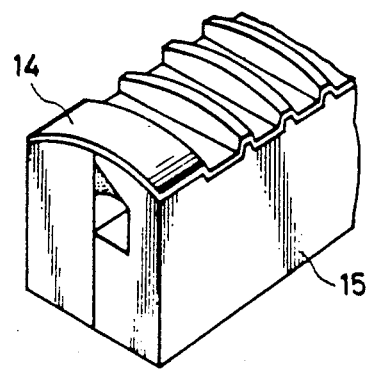
Figure 12:
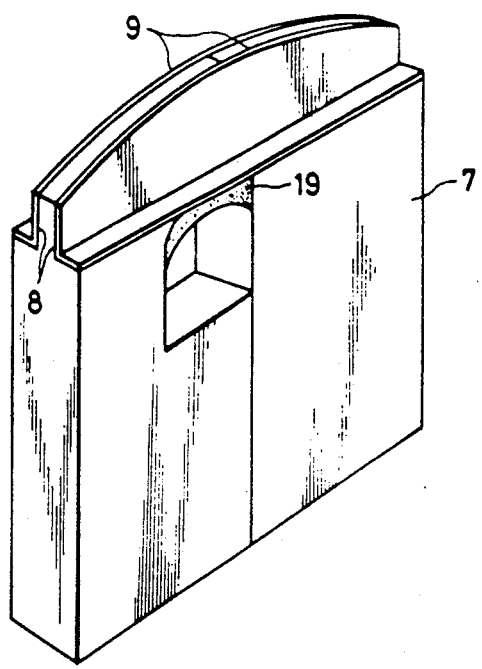
FIG. 12 is a perspective view of a magnetic head constructed according to a preferred embodiment of the present invention.

As shown in FIG. 11, a thin film 14 made of a hard nonmagnetic material such as alumina ($Al_2O_3$) or titanium nitride (TiN) is formed on the cylindrical surface 200 of the head block 13 and in the track width defining grooves 12 by a suitable thin film forming technique such as evaporation, sputtering or ion plating. As a result, a head block 15 is obtained.

The cylindrical surface of the head block 15 is ground and polished again to remove the thin film of hard nonmagnetic material 14 except in the grooves 12. The head block 15 is then sliced along the center line of each groove 12 to produce discrete magnetic heads of the type shown in FIG. 12.

Each of the magnetic heads has a configuration such that the track width defined by the surface of the magnetic core 7 which contacts a magnetic tape is equal to the width of the ridge 8 left between adjacent grooves and both sides of the magnetic gap in the core 7 are coextensive with the flat surfaces of the ridge 8. The surfaces of the films 9 of a nonmagnetic hard material such as alumina or titanium nitride that are formed on the ridge 8 are flush with the surface of the magnetic core 7 that is in sliding contact with the magnetic tape.

With the configuration described above, the magnetic tape is in sliding contact with the curved faces of the magnetic core 7 and the film 9. The potential wear of the magnetic gap of the core 7 is appreciably reduced on account of the hardness and wear resistance of the films 9.

While a preferred embodiment of the present invention has been described with reference to a magnetic head used in a video tape recorder or an audio digital tape recorder, it should be understood that the concept of the present invention is also applicable to magnetic heads for use with hard disks or floppy disks.

As discussed above, in the prior art technique, two blocks serving as the halves of a core have to be joined together in such a way that the opposite grooves for controlling the track width are brought into registry. However, this track matching step is unnecessary in fabricating the magnetic head of the present invention. Track width control grooves are formed in the core blocks after they are joined together into a single head block. Moreover, the surfaces on both sides of the magnetic gap are protected by a thin film of nonmagnetic hard material against core chipping that might otherwise occur upon vigorous sliding contact with magnetic tape.

The potential wear of the surface of the core that is in sliding contact with the magnetic tape is appreciably reduced on account of the wear resistance of the curved faces of the thin films of nonmagnetic hard material, which contributes to an improvement in the performance and reliability of the core.

The thin film of nonmagnetic hard material is formed on a single core block which is subsequently sliced into a plurality of discrete magnetic heads. Because of the high production rate, thereby obtained the magnetic head of the present invention can be manufactured at a low cost.

What is claimed is:

1. A magnetic head comprising a pair of magnetic cores, a gap-forming film joining said pair of magnetic cores which form a magnetic gap, both lateral sides of said gap being flat except for a surface adapted to be in sliding contact with magnetic tape, said surface having the same width as a track width, each of said flat sides being coated with a nonmagnetic thin hard film.

2. A magnetic head for recording or playing back a magnetic tape, comprising:
   a pair of half cores;
   a gap-forming film joining said pair of half cores so as to form a single magnetic core having a magnetic gap extending in a first direction, said single magnetic core having a ridge extending therefrom, the width of said ridge being less than the width of said magnetic core such that said magnetic core includes a pair of flat surfaces on opposite sides of said ridge, said ridge having a curved surface extending in a second direction transverse to said first direction; and
   a non-magnetic hard film provided on said flat surface and on opposite sides of said ridge, the width of said curved surfaces and said film adapted to be the same as the width of said tape.

3. The magnetic head of claim 2, wherein said nonmagnetic thin hard film is formed of a material selected from the group consisting of alumina and titanium nitride.

* * * * *